(12) United States Patent
Rowe et al.

(10) Patent No.: US 6,943,470 B2
(45) Date of Patent: Sep. 13, 2005

(54) AIR GAP BAFFLE ASSEMBLY FOR GAS-COOLED TURBINE GENERATOR AND METHOD OF INSTALLING

(75) Inventors: Charles M. Rowe, Titusville, FL (US); Gary R. Lowther, Casselberry, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/725,755

(22) Filed: Dec. 2, 2003

(65) Prior Publication Data

US 2005/0116555 A1 Jun. 2, 2005

(51) Int. Cl.$^7$ ................................................ H02K 9/00
(52) U.S. Cl. .......................................... 310/58; 310/59
(58) Field of Search .............................. 310/52, 55, 58, 310/59

(56) References Cited

U.S. PATENT DOCUMENTS

| | | | |
|---|---|---|---|
| 3,110,827 A | 11/1963 | Baudry | 310/55 |
| 3,265,912 A | 8/1966 | Baudry | 310/59 |
| 4,315,173 A * | 2/1982 | Calfo et al. | 310/53 |
| 4,751,412 A | 6/1988 | Lowther et al. | 310/52 |
| 4,803,563 A | 2/1989 | Dailey et al. | 358/100 |
| 4,962,660 A | 10/1990 | Dailey et al. | 73/12.09 |
| 4,970,890 A | 11/1990 | Jaafar et al. | 73/12.09 |
| 5,020,234 A | 6/1991 | Alkire et al. | 33/656 |
| 5,177,385 A * | 1/1993 | Cooper et al. | 310/53 |
| 5,365,166 A | 11/1994 | Dailey et al. | 324/158 |
| 6,365,166 B2 | 4/2002 | Beaurline et al. | 424/400 |

* cited by examiner

Primary Examiner—Joseph Waks

(57) ABSTRACT

A gas-cooled turbine generator includes a rotor having baffles arranged in rings and defining a plurality of gas cooling zones. A stator core has stator slots in a bore in which the rotor is received. A plurality of air gap baffle assemblies are arranged in segmented baffle rings in the stator slots and cooperate with the zone rings on the rotor. Each of the air gap baffle assemblies includes at least one baffle segment and an individual locking cam cooperating with a respective wedge of the baffle segment to lock the baffle segment relative to a stator slot at which the baffle segment is positioned such that prior baffle "trains" are no longer required.

18 Claims, 9 Drawing Sheets

AIR GAP BAFFLE ASSEMBLY FOR GAS-COOLED TURBINE GENERATOR AND METHOD OF INSTALLING

FIELD OF THE INVENTION

This invention relates generally to the ventilation of gas-cooled turbine generators, and more particularly, this invention relates to an improved method for installing segmented rings of air gap baffles on a stator core and forming cooling zones in a large turbine generator.

BACKGROUND OF THE INVENTION

Large turbine generators are constructed in which a coolant gas, usually hydrogen, is circulated through ducts in the stator and rotor slots in direct thermal relation with the current-carrying conductors inside ground insulation. These type of systems are disclosed in commonly assigned U.S. Pat. Nos. 3,110,827; 3,265,912; and 4,751,412. Cooling is accomplished by dividing the air gap formed between the rotor and stator core transversely into a plurality of annular zones by positioning baffles in annular rings in the air gap. These baffles are mounted on the stator core, which oppose rings on the rotor. Typically, there are about five to about eight circumferentially extending baffle rings or groups of baffles that form alternate cooling zones, which are connected to the high pressure, or discharge side of blower, typically mounted on the rotor shaft. Any remaining cooling zones are connected to the low pressure or entrance side of the blower. Radial ducts or passages in the rotor in each cooling zone permit the cooling gas to flow from the high pressure zones to low pressure zones and through longitudinal ducts of the rotor winding. This pressure exerted by the blower forces the gas through rotor ducts in short axial paths to obtain adequate gas flow.

The baffles arranged on the stator core typically are configured to form about a 0.060 inch gap between the two, which prevents gas flow between the baffles and cooling zones. The baffles also must be formed to maintain their position without lateral movement and thus maintain the integrity of the cooling zones. The stator baffles must be removable even when the rotor is in place, as explained in the above-identified and incorporated by reference patents. For example, the '912 patent teaches the use of annular stationary baffles positioned in a ring along the bore of the stator core. These baffles align radially with the baffles of the rotor. Each stationary baffle train is formed as segmented baffle segments, each having a baffle base disposed in a slot of the stator core. The baffle segments are interconnected in a longitudinally extending baffle train. For example, the baffles disclosed in the '912 patent include a row of longitudinally spaced baffle segments and held together end-wise with steel cables. Abutting the ends are spacers, and the bases of baffle segments are oppositely tapered, forming a compressive load applied end-to-end. Steel cables extends from one end of the row to the other end and placed under tension to wedge this assembly or baffle train into place. This type of approach creates cable and tensioning problems. For example, the cable is often stretched and major repairs are required. Additionally, the entire "train" of baffles must be inserted or withdrawn as one unit and placed on a tray for storage or service, which can be time-consuming and expensive.

The '412 patent discloses another "baffle" system using a "train" of camlocked air gap baffles and an improved method of installing baffles within the stator of large gas-cooled dynamoelectric machines (gas-cooled turbine generators) using segmented baffles spaced by insulated tubes. Each baffle includes a lower, tapered wedge and upper transverse member. The "train" includes a very long tube or other support having a number of rotatable cams that are positioned on the tube to engage and expand the wedge against the stator slot and lock the baffle in place. The entire baffle train for a stator must be inserted or removed when only one baffle is inserted or replaced. Also, the longitudinally extending tubes are prone to torsion and twist, and thus, some wedges and baffles may lock while others may not lock properly.

It would be advantageous if a system method for installing air gap baffles configured in segmented baffle rings could be accomplished without using long baffle "trains," which add complexity during installation, increase repair time and costs, and decrease the durability of the component parts in service.

SUMMARY OF THE INVENTION

The present invention advantageously uses a self-propelled vehicle, such as a robot crawling device, to install and lock segmented rings of air gap baffle assemblies within at least a ring forming the center cooling zone on the stator core and progresses around the ring installing individual air gap baffle assemblies. Working from each end of the stator core, the air gap baffle assemblies can be placed and locked until a complete, segmented ring of baffle assemblies is installed under corresponding rings forming rotor cooling zones. In the present invention, a proper air gap can be measured when a baffle assembly is installed. The removal of air gap baffle assemblies can also be accomplished by the robot crawling device or other device by locating and unlocking the air gap baffle assemblies (segments) when removal is required.

The present invention provides a lower cost system and method for installing air gap baffle assemblies while permitting a better air gap baffle seal such that segmented rings of air gap baffles can be inspected and measured during initial installation, versus checking the gaps only on the segmented rings at the ends. The present invention is also is a more simple air gap baffle assembly design with fewer parts. A baffle train is no longer required. There is also a shorter lead-time to manufacture the air gap baffle assembly components. Repair problems with broken air gap baffle components is decreased and the on-site repair of air gap baffle assemblies is simplified because only replacement segments of the baffle assembly are required, as compared to sending 30-foot long air gap baffle trains off-site in trays.

In accordance with the present invention, a gas-cooled turbine generator includes a rotor having baffles arranged in rings and defining a plurality of gas cooling zones. A stator core has stator slots in a bore in which the rotor is received. A plurality of air gap baffle assemblies are arranged in segmented baffle rings in the stator slots and cooperating with the baffles on the rotor. Each of the air gap baffle assemblies includes at least one baffle segment and an individual locking cam cooperating with a respective baffle segment to lock the baffle segment relative to a stator slot at which the baffle segment is positioned. The individual locking cam only cooperates with the respective baffle segment or an adjacent segment in the segmented ring and does not lock other baffle segments in other segmented rings as in the prior art using a long baffle "train."

The baffle segment comprises a tapered wedge formed to receive the individual locking cam such that upon twisting of the locking cam, the wedge deforms to lock the baffle segment relative to the stator slot. Each individual locking cam can be formed as a tubular stub member having an external locking cam surface for engaging the wedge such that upon rotation of the locking cam, the external locking cam surface deforms the wedge. Each baffle assembly can also include a locking plate received within a stator slot and cooperating with the wedge. A locking plate can include an external lock for locking the plate relative to a core vent and preventing movement of the baffle assemblies, particularly the first and last baffle assembly installed in a segmented ring.

Each tapered wedge preferably is formed by leg members forming a bore that receives the locking cam. Each individual locking cam can also include an end portion adapted for engaging a locking tool carried by a self-propelled vehicle or equal that is insertable and moveable within the air gap formed between the stator and rotor. Each baffle segment includes a transverse member having an arcuate surface that cooperates and defines a gap with baffles on the rotor. Each baffle assembly can also be formed as two baffle segments positioned adjacent to each other with transverse members of different widths such that the transverse members are dimensioned to interlock adjacent baffle assemblies forming the segmented baffle ring.

A method is also set forth for installing baffle assemblies within segmented rings within stator slots of a stator core of a gas-cooled turbine generator, where each baffle assembly includes a baffle segment cooperating with baffles on rotor (rings) to form gas zones for cooling and a locking cam that locks the baffle segment relative to a stator slot. The method comprises the step of positioning a baffle assembly relative to a stator slot by a self-propelled vehicle or equal and locking the baffle assembly by engaging a locking tool carried by the self-propelled vehicle with a locking cam.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously overcomes the disadvantages of using air gap baffles located on long baffle trains that incorporate baffle blocks or segments positioned on a cable or long rods and positioned to form three to eight baffle rings (typically five) to provide direct cooling gas in zone cooled rotors/stators. The present invention uses a self-propelled vehicle, for example, a robot crawling device or robotic conveyor mechanism to install and lock air gap baffle (AGB) assemblies of the present invention even when the large turbine generator rotor is installed. Additionally, the air gap baffle assemblies can be removed using the self-propelled vehicle or equal, which locates and unlocks locking cams that hold the baffle segments in place when removal is required. The first air gap baffle assembly of a segmented baffle ring can be installed at the center cooling zone and installation can progress around to form the segmented ring. Working from each end of the stator, the air gap baffle assembly can be placed and locked until all air gap baffle assemblies forming a segmented baffle ring are installed under the baffle rings of a rotor. The proper baffle gap formed by a baffle on the rotor and a baffle assembly on the stator is measured by an appropriate measuring device selected by those skilled in the art and carried by the self-propelled vehicle when the baffle assembly is installed.

Figure 1:
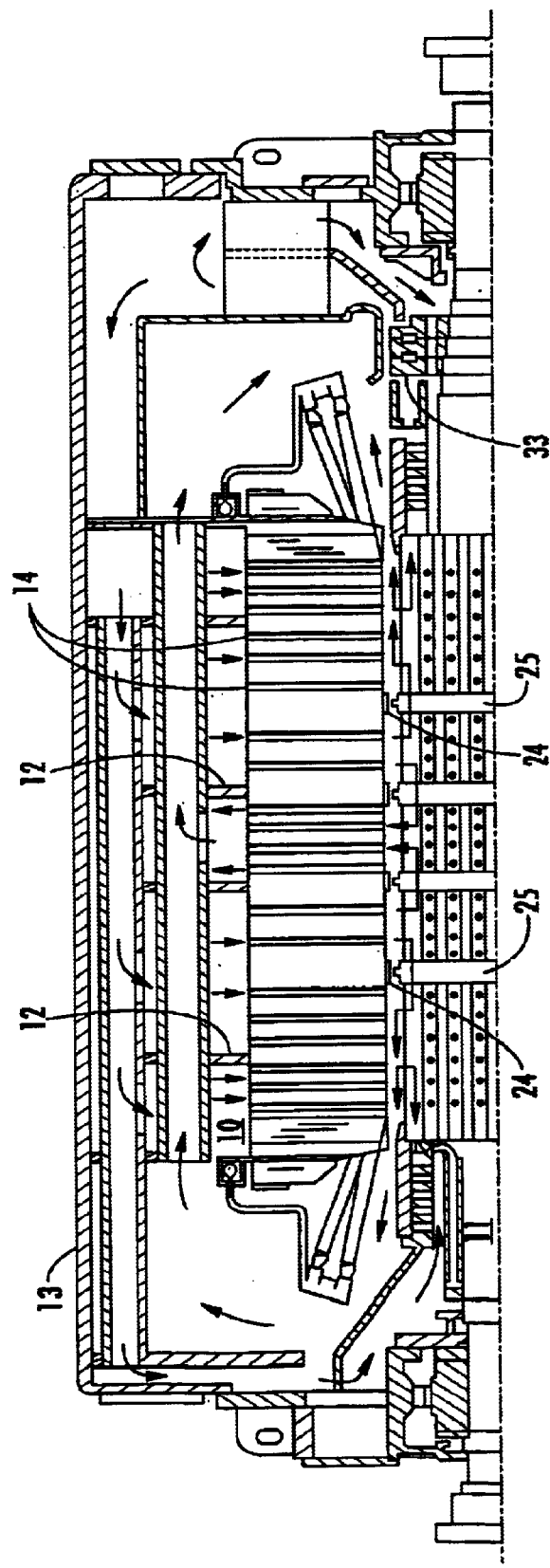
FIG. 1 is a sectional view of an upper half of a dynamo-electric machine for a large gas-cooled turbine generator that could be used with the present invention.

For purposes of description, a large turbine generator, such as shown in FIG. 1, is described and other details for this type of turbine generator are disclosed in the incorporated by reference U.S. Pat. Nos. 4,751,412; 3,265,912; and 3,110,827.

Referring now to FIG. 1, there is shown in FIG. 1 a dynamoelectric machine pictured as a gas-cooled large turbine generator (LTG), comprising a stator core 10 and a rotor 11. In this specific example as illustrated, the stator core 10 is supported by frame rings 12 in a substantially gas-tight outer housing 13. The stator core 10, as is conventional, is a laminated annular core of the usual type having a cylindrical bore therethrough. The core 10 is built up of laminations arranged in spaced stacks to provide radial vent ducts 14 between them. The laminations of the core are clamped between suitable end plates in the usual manner. Further details of such a dynamoelectric machine are covered in detail within the above-identified patents, notably U.S. Pat. No. 3,265,912.

The stator core 10 is provided with longitudinal slots 15 (FIG. 2) in its inner periphery for the reception of a stator winding which may be of any suitable type and may consist generally of a plurality of half coils connected at their ends to form the winding. This stator winding can be of the type having an inner cooled construction, and each half coil can be formed of two stacks of conductor strands which are lightweight, insulated and transposed in the usual manner. They can be separated by ducts of high resistance metal, which are lightly insulated from each other and from the conductor strands. The ducts extend longitudinally from one end to the other of the half coil for circulation of a coolant in close thermal relation to the conductor strand. The half coil is enclosed in a heavy sheath of insulation to provide the necessary high voltage insulation to ground. Two half coils are often placed in each slot of the stator core and the slots are closed by suitable wedges. The ducts extend out of the coils at the ends and coolant may be circulated through them in a closed recirculating system, as described in the above-mentioned U.S. Pat. No. 3,110,827, or in any other desired manner.

The rotor 11 is disposed in the bore of the stator core 10 and separated from the stator by an annular air gap. As is conventional, the rotor 11 is supported in bearings mounted in the ends of the housing 13, and means such as gland seals may be provided to prevent leakage of gas from the housing 13 along the shaft. The rotor 11 is also provided with longitudinal slots in its periphery for the reception of a field winding, the conductors of which extend longitudinally of the rotor and have circumferentially extending end turn portions, which are supported against centrifugal forces by retaining rings of usual construction.

As previously stated, the housing 13 of the machine is made as nearly gas-tight as possible, and is sealed at the points where the rotor shaft passes through it by means such as gland seals. The housing is filled with a suitable coolant gas, preferably hydrogen, which is utilized for cooling the rotor and the stator core. A blower 33 is mounted on the rotor shaft typically adjacent one end of the machine for circulating the gas therethrough. The blower 33 may be of any suitable type, such as a multistage blower of the axial flow type, as shown in the drawing. The gas in the machine is maintained at a suitable static pressure, which may for example, be from about 30 to about 75 pounds per square inch above atmospheric pressure. As such, the blower 33 develops sufficient differential pressure to maintain the desired circulation of gas within the housing 13 and through the various ducts in the manner described hereinafter.

As more fully described in U.S. Pat. No. 3,110,827, adequate gas flow through the ducts of the rotor winding is obtained by dividing the path of the gas through the ducts into a plurality of relatively short longitudinal paths, and the pressure of the blower 33 is used to cause the gas to flow through these short paths. For this purpose, the air gap is divided transversely into a plurality of annular zones. This is accomplished by using rings of baffle assemblies placed in the air gap and extending around the bore of the stator to form the annular zones. Adjacent zones are maintained at different gas pressures to cause the gas to flow from one zone to the next through the rotor ducts.

A plurality of baffle assemblies 24 are arranged in annular, segmented rings and mounted on the stator core. Corresponding zone rings 25 are mounted on the periphery of the rotor. The baffles 25 on the rotor may be non-magnetic steel rings shrunk-fit to the rotor body and, if desired, locked in place by any suitable means. The structure of the stationary baffle assemblies 24 will be described later in greater detail. The stator and rotor baffles 24 and 25 are radially aligned with each other and have a small, running clearance. Thus, the baffles 24 and 25 divide the air gap 16 transversely into a plurality of annular zones, e.g., four zones when five baffle rings are used.

In order to minimize leakage of gas directly between adjacent cooling zones formed in the air gap, the clearance between the stationary baffle assemblies 24 and the baffles 25 of the rotor must be made quite small typically about 0.060 inches. Provision must be made, however, for installing the rotor in the machine without damaging the baffles, and for removing the rotor if necessary. For this reason, the stator baffle assemblies 24 are designed such that they can be installed after the rotor is in place and are easily removed to permit a skid or other device to be inserted. Thus, the rotor can be installed or removed by the usual procedures without interference from the baffles and without risk of damage to the baffles.

Figure 2:
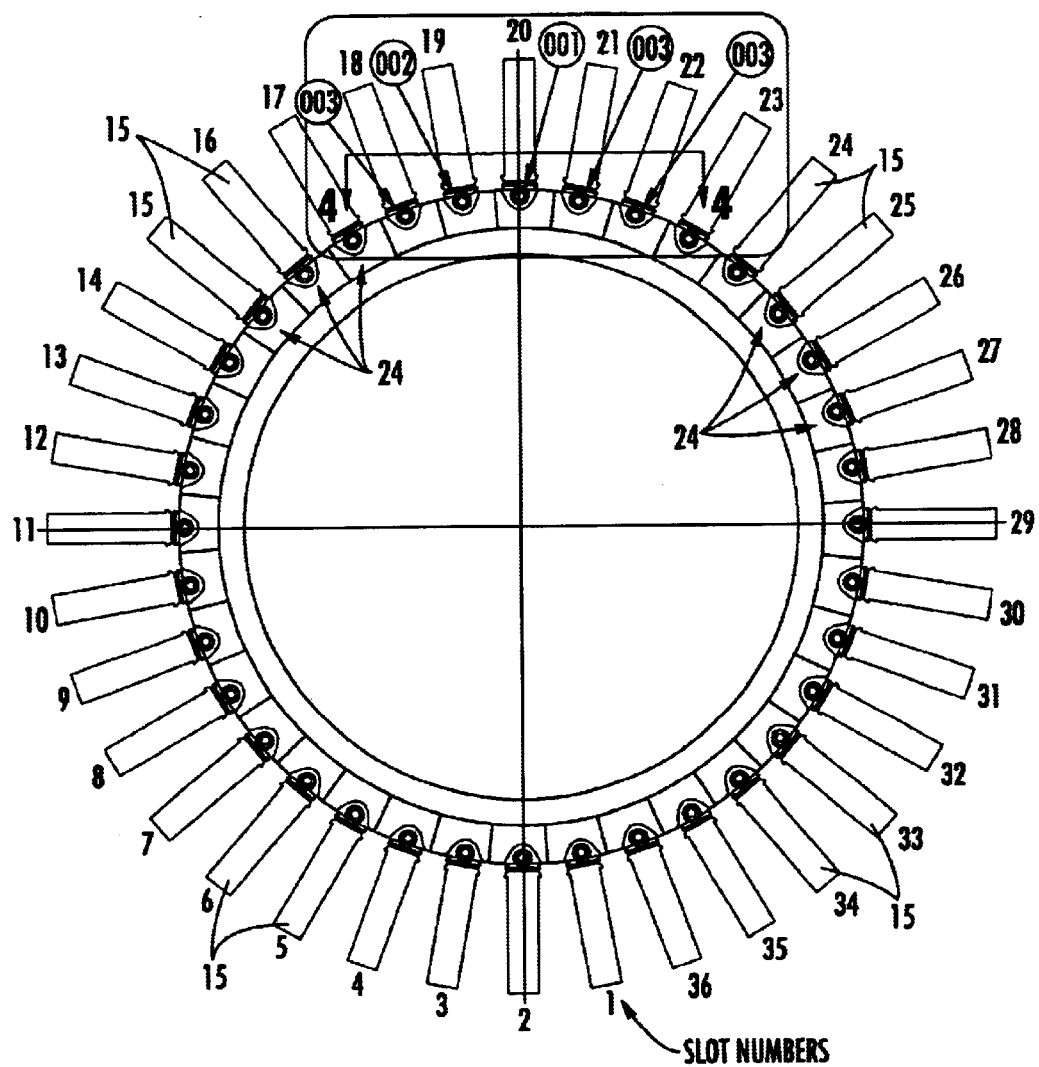
FIG. 2 is a fragmentary, sectional view looking at the exciter end of a large turbine assembly, such as shown in FIG. 1, and showing the stator core provided with longitudinal slots and receiving in a segmented ring a plurality of air gap baffle assemblies of the present invention.
Figure 3:
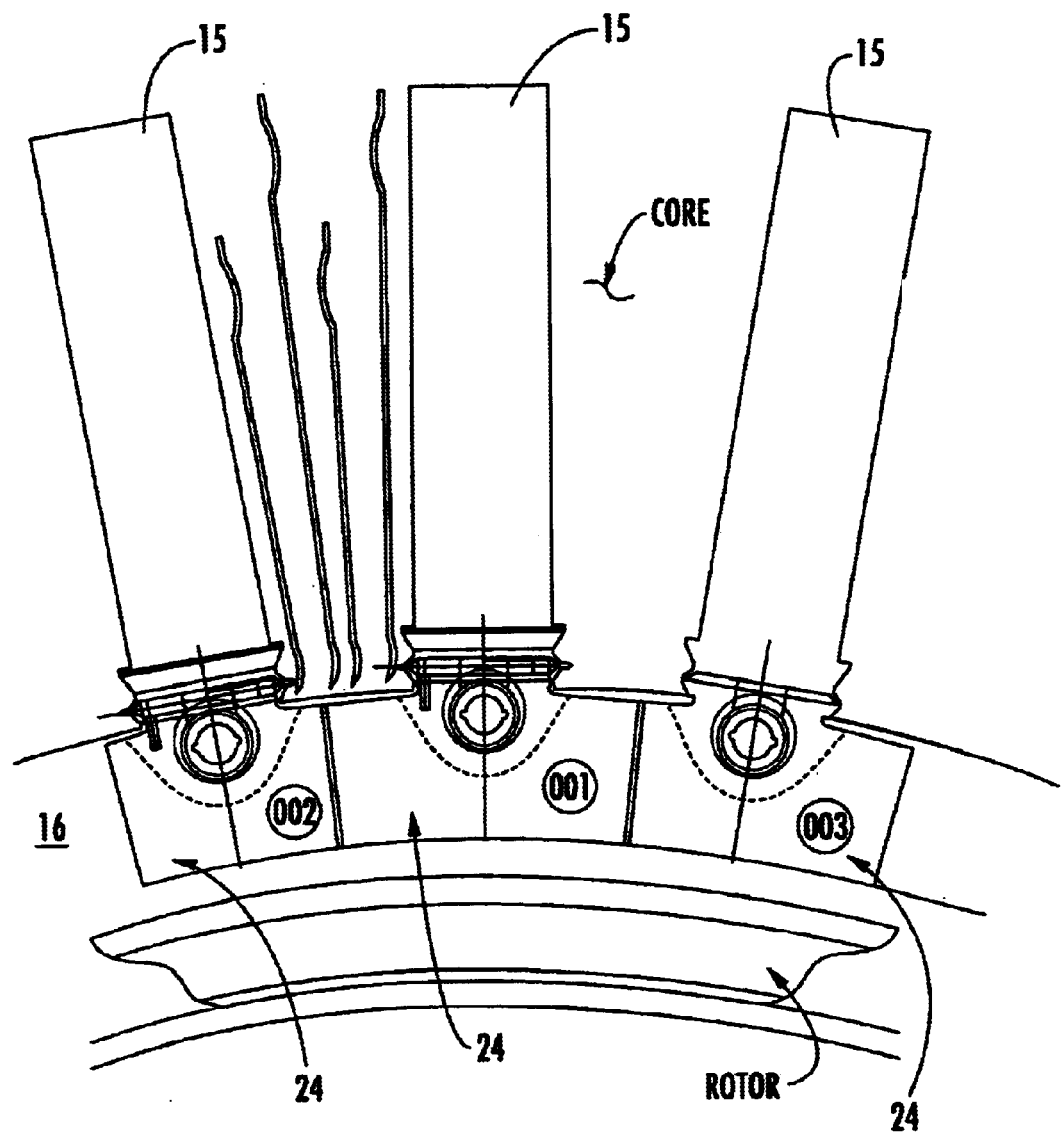
FIG. 3 is an enlarged view of a selected portion of FIG. 2 showing segmented air gap baffle assemblies received in slots.
Figure 4:
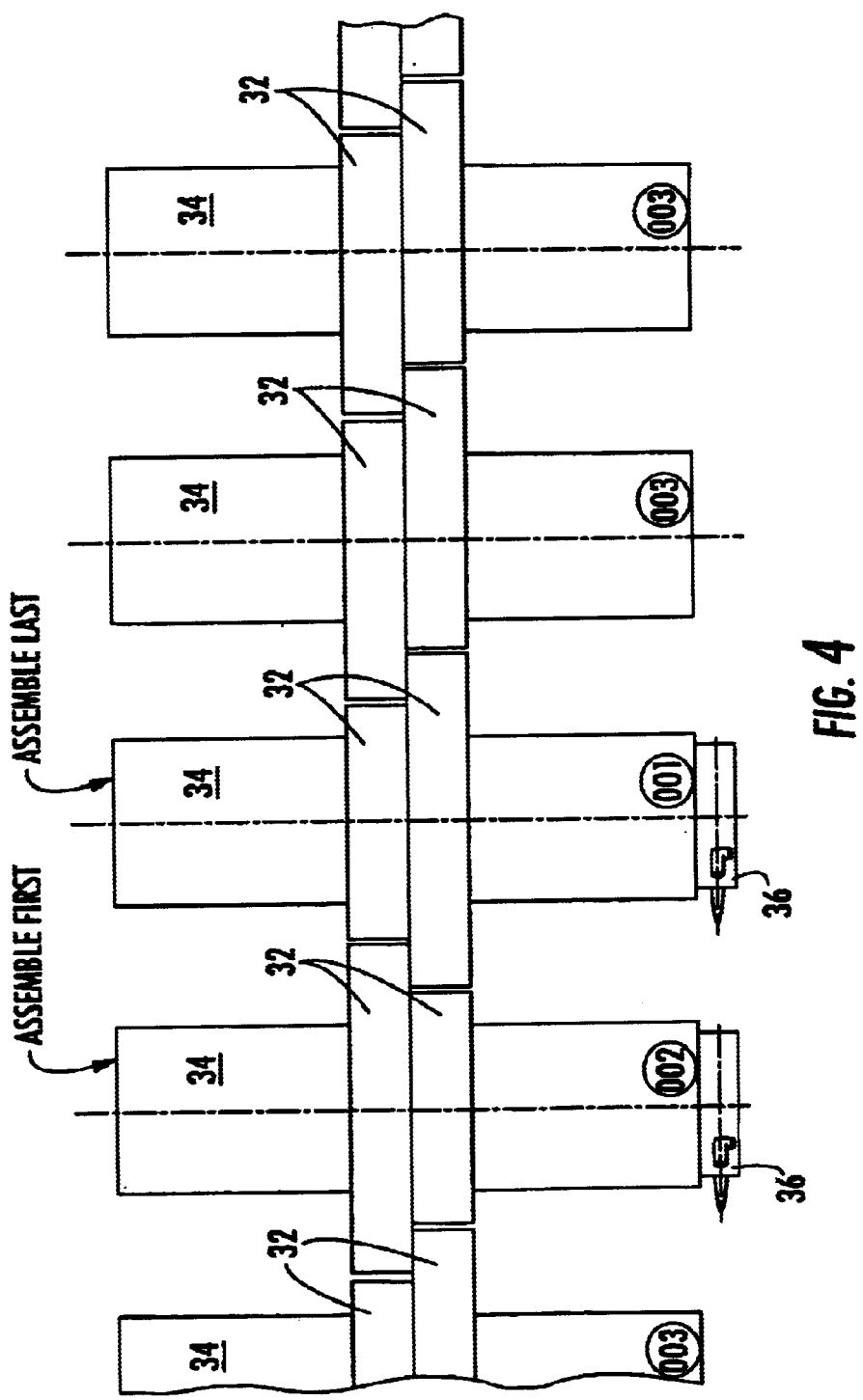
FIG. 4 is a fragmentary, sectional view taken along line 4—4 of FIG. 2 and looking down at the segmented air gap baffle assemblies and showing interlocking transverse members of baffle segments and the locking plates assembled first and last having additional locks.
Figure 5:
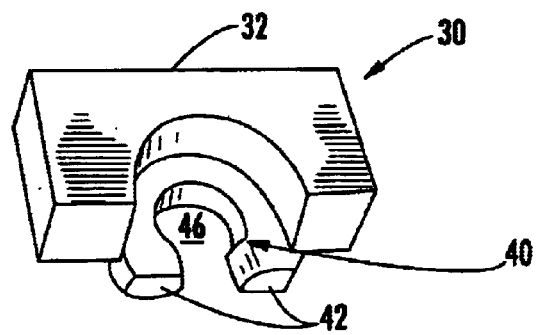
FIG. 5 is a perspective view of an air gap baffle segment that can be used in the present invention.
Figure 7:
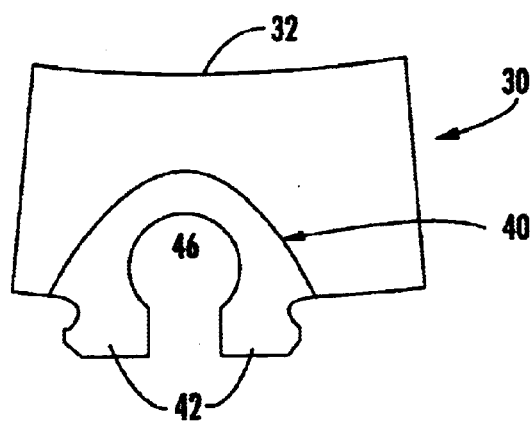
FIG. 7 is a front elevation view of an example of segmented air gap baffle segment that can be used in the present invention and showing the wedge offset with the medial portion of the transverse member.
Figure 8:
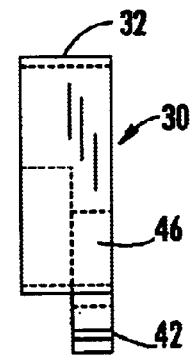
FIG. 8 is a side elevation view of the air gap baffle segment shown in FIG. 7.
Figure 9:
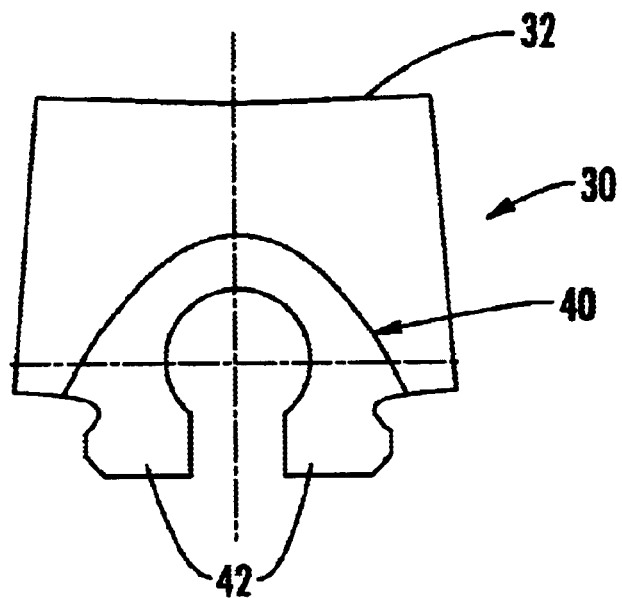
FIGS. 9 and 10 are front elevation views of other air gap baffle segments that can be used in the present invention with the air gap baffle segment in FIG. 10 having a greater width than the air gap baffle segment shown in FIG. 9, but both segments having the wedge centered with respect to the transverse member.
Figure 10:
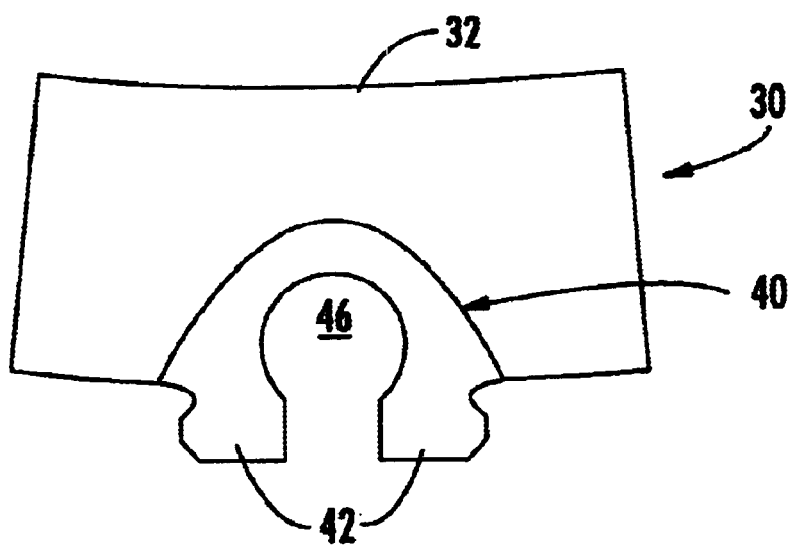

FIG. 2 illustrates a fragmentary sectional view of the turbine and looking in the direction of the exciter end. This view shows the longitudinal slots 15 formed in the stator core and the segmented air gap baffle assemblies 25 of the present invention inserted within the slots and extending out into the air gap. FIG. 3 is an enlarged view of slots 19, 20 and 21 and baffle assemblies 25 and FIG. 4 is a fragmentary, sectional view taken along line 4—4 of FIG. 3. and showing in plan a number of baffle segments 30 with transverse members 32, formed as gentle arcuate surfaces (FIGS. 7, 9 and 10). These air gap baffle segments 30 form part of the baffle assemblies 24 of the present invention and are retained on locking plates 34. Those air gap baffle assemblies 24 that are assembled first and last in position to form segmented rings include locking plates 34 that have additional external locks 36 to prevent those locking plates from moving end-to-end or transversely. As shown in FIG. 4, two air gap baffle segments 30 are positioned adjacent to each other and dimensioned to interlock other transverse members 32 forming the segmented baffle ring. Different transverse members 32 have different transverse widths to aid in locking them relative to each other and overlapping to form a seal to prevent hydrogen or other cooling gas from leaking between the different zones. The external locks 36 can be formed as a pin that locks in place or other means.

Figure 6:
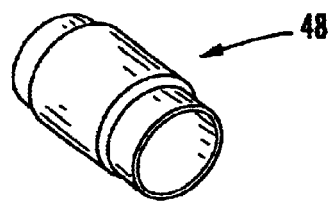
FIG. 6 is a perspective view of locking cam that works in conjunction with the air gap baffle segment shown in FIG. 5.
Figure 11:
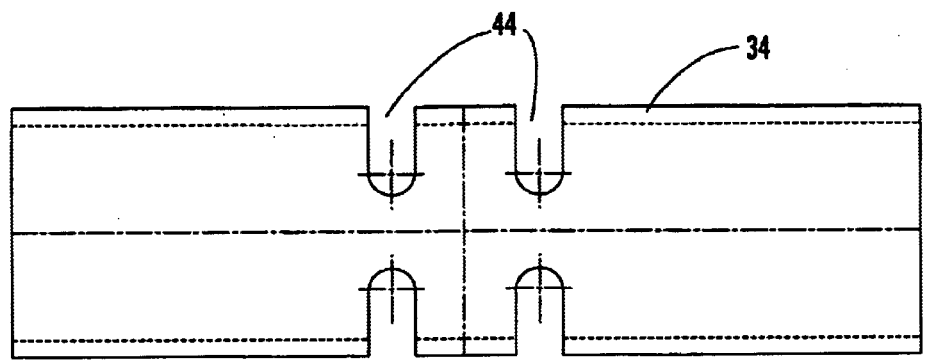
FIGS. 11 and 12 are plan views of locking plates for air gap baffle segments, with FIG. 12 showing an additional, external plate locking mechanism used for the air gap baffle segments installed first and last in a segmented ring.
Figure 12:
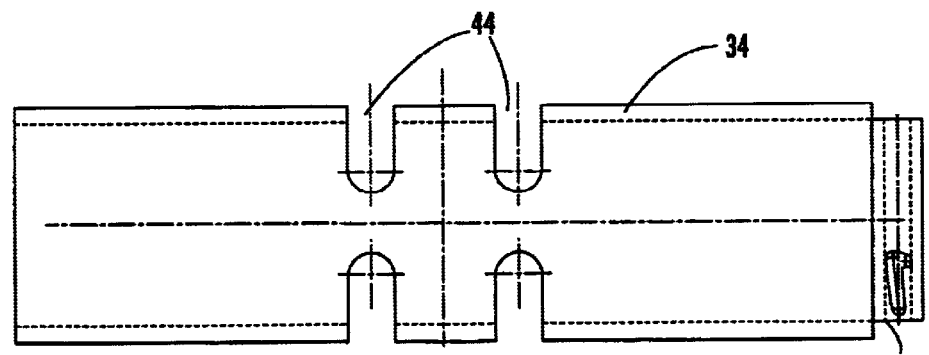
Figure 14:
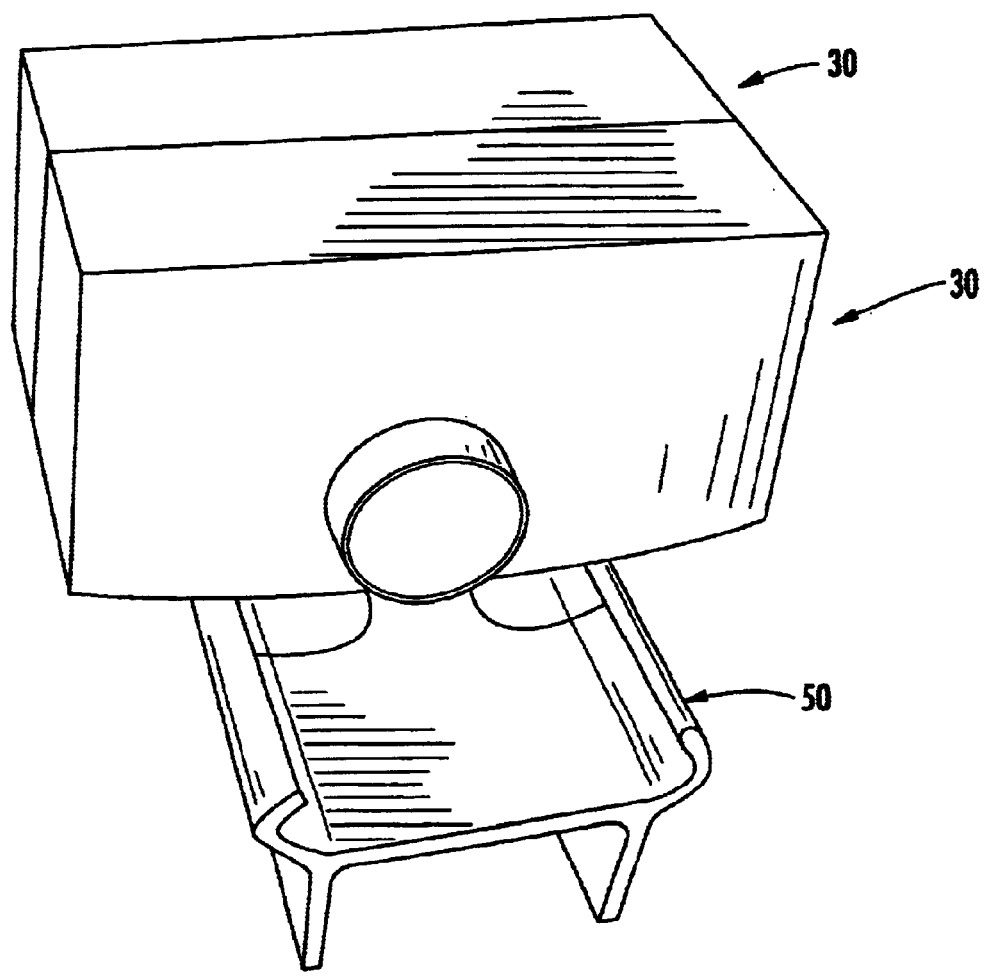
FIG. 14 is a perspective view of air gap baffle segments shown together and locked onto a representative groove that is similar to the groove used in the stator core slots.

FIGS. 5 and 7–10 illustrate the different configurations for baffle segments 30, showing the different size transverse members to aid in interlocking baffle assemblies 24 as shown in FIG. 4. Each baffle segment 30 includes the upper transverse member 32 and a tapered wedge 40 formed as two legs 42 that extend into corresponding slots 44 formed at the sides of the locking plate (FIGS. 11 and 12). The legs 42 engage the slots 44 similar to a dovetail joint. Each locking plate 34 includes two slots 44 on either side and spaced from each other to permit dual baffle segments to be received on the locking plate. Each baffle segment 30 includes a center opening 46 within the wedge formed by the legs, which receives a locking cam 48 as shown in FIG. 6. The locking cam is formed as a short, tubular stub member. The locking cam 48 has an external locking cam surface, which when turned, deforms the legs 42 and twists them against the slots 44 in the locking plate 34 and twists the locking plate 34 slightly for locking the entire baffle assembly 24. FIG. 14 shows two baffle segments 30 locked by a locking cam 48 to a locking plate and positioned in a channel 50 formed similar to the type of channel used for the stator. The locking cam 48 is received within the center opening 46 formed at each wedge.

FIGS. 7, 9 and 10 illustrate elevation views of different baffle segments 30 showing transverse members having different widths corresponding to the segment widths shown in FIG. 4.

Figure 13:
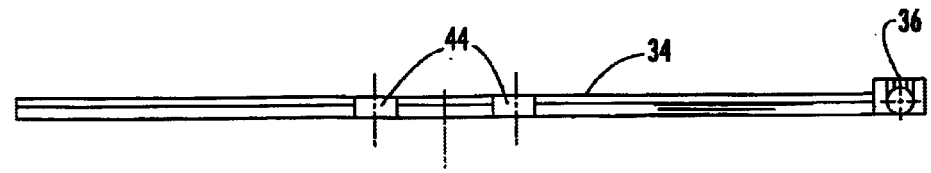
FIG. 13 is a side elevation view of the locking plate shown in FIG. 12.

FIGS. 11–13 illustrate plan views of a locking plate 34 and showing the slots 44 used to receive the wedge 40 of the baffle segments 30. FIGS. 12 and 13 illustrate a locking plate having the additional or external lock 36 on the end of the locking plate, as shown in FIG. 4, which locks the first and last assembled baffle segments 30 and associated locking plates 34 into their respective positions to prevent movement of the respective baffle segments and their locking plates. The external lock could be a pin or other means as explained before. The locking cam 48 is turned during installation to lock the wedge 40 relative to the slots 44 in the locking plate 34. The turning can be accomplished using a self-propelled vehicle, for example, a modified moveable carriage or robot crawling device, such as disclosed in U.S. Pat. Nos. 6,365,166; 4,803,563; 4,962,660; 4,970,890; and 5,020,234, the disclosures which are hereby incorporated by reference in their entirety.

Figure 15A:
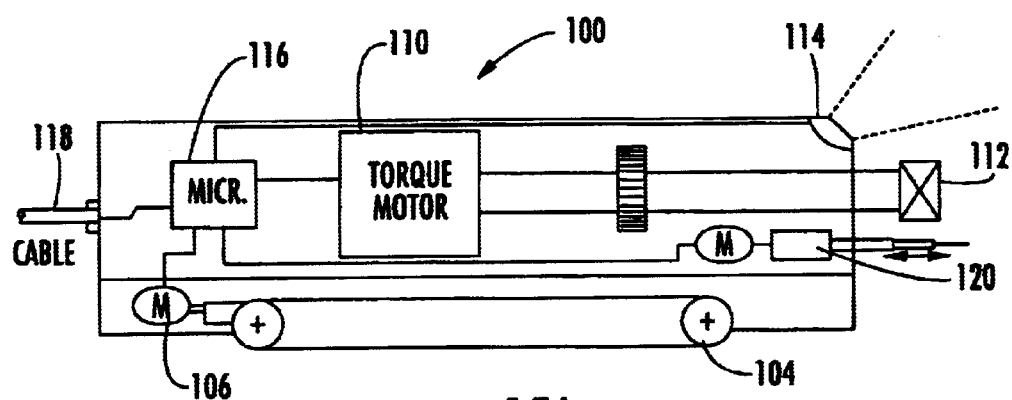
FIGS. 15A and 15B are fragmentary block diagrams of a self-propelled vehicle as a robot crawling device or remote conveyor that can be used for installing the air gap baffle assemblies in large turbine generators of the present invention.
Figure 15B:
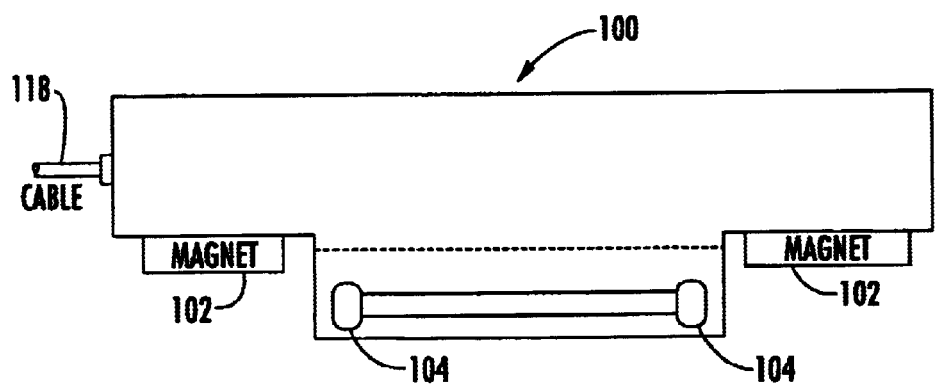

FIGS. 15A and 15B show a modified version of a self-propelled vehicle 100 as a robot or moveable carriage that includes a robot mechanism formed as a robot crawling device. The vehicle 100 includes magnets 102 and crawler feet 104 powered by a motor and transmission 106 for powering the vehicle to the proper location along the stator. A torque motor 110 drives a locking tool 112 on the end of the crawler for turning the locking cams 48. A TV or video camera 114 is operative for inspecting the air gap baffle to zone ring gap and ensuring proper placement of the baffle assemblies 24. The vehicle 100 moves into the middle portion of the stator and rotor area and is held by the magnets 102 to the stator surface. With the use of the video camera 114, the locking tool 112 locks the various baffle segments 30 into place as the vehicle engages the locking cam 48 and rotates the locking cam 48 to lock individual baffle assemblies into their proper place. A microprocessor 116 controls the torque motor and video camera and signals are sent back through a cable tether 118 or other means, including wireless signals. The microprocessor 116 can control a telescoping pusher mechanism 120 for engaging the external lock 36 on a locking plate. Other designs are possible and a telescoping pusher mechanism is shown as an example only. It is also possible to use a manual pole and a locking tool or other means on its end for positioning and locking the baffle assemblies 24, especially with those segmented rings closest to the ends, which can be reached manually more easily.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A gas-cooled turbine generator comprising:
   a rotor having baffles arranged in rings and defining a plurality of gas zones;
   a stator core having stator slots and a bore in which said rotor is received, and a plurality of air gap baffle assemblies arranged in segmented baffle rings within said stator slots and cooperating with said baffles on said rotor, each of the air gap baffle assemblies comprising at least one baffle segment and an individual locking cam cooperating with a respective baffle segment and unconnected to other locking cams of the baffle segments in the respective segmented baffle ring and locking the baffle segment relative to a stator slot at which the baffle segment is positioned without locking other locking cams of the baffle segments in the respective segmented baffle ring.

2. A gas-cooled turbine generator according to claim 1, wherein said baffle segment comprises a wedge formed to receive said individual locking cam such that upon twisting of said locking cam, said wedge is deformed for locking said baffle segment relative to said stator slot.

3. A gas-cooled turbine generator according to claim 2, wherein each individual locking cam comprises a tubular stub member having an external locking cam surface for engaging said wedge such that upon rotation of said locking cam, said external locking cam surface deforms the wedge.

4. A gas-cooled turbine generator according to claim 2, wherein each baffle assembly further comprises a locking plate received within a stator slot and cooperating with said wedge.

5. A gas-cooled turbine generator according to claim 4, wherein said locking plate includes an external lock for locking said plate relative to a slot to prevent movement of said baffle assemblies.

6. A gas-cooled turbine generator according to claim 2 wherein said wedge comprises leg members forming a bore that receives said locking cam.

7. A gas-cooled turbine generator according to claim 1, wherein each individual locking cam comprises an end portion adapted for engaging a locking tool carried by a self-propelled vehicle that is insertable and movable within an air gap formed between said stator and rotor.

8. A gas-cooled turbine generator according to claim 1, wherein each baffle segment comprises a transverse member having an arcuate surface that cooperates and defines a gap with baffles on said rotor.

9. A gas-cooled turbine generator according to claim 8, wherein each baffle assembly comprises two baffle segments positioned adjacent to each other, and said transverse members are dimensioned to interlock transverse members of adjacent baffle assemblies forming the segmented baffle ring.

10. A dynamoelectric machine comprising:
   a substantially airtight casing adapted to be filled with a cooling gas;
   a stator core disposed within the casing and including a cylindrical bore and longitudinal stator slots formed therein;
   a rotor positioned for rotation within said cylindrical bore and forming an air gap between said rotor and stator core;
   a plurality of baffles positioned on said rotor in a ring within said air gap and defining a plurality of gas zones for cooling; and
   a plurality of air gap baffle assemblies arranged in segmented baffle rings within said stator slots and cooperating with said baffles on said rotor, each of the air gap baffle assemblies comprising at least one baffle segment and an individual locking cam cooperating with a respective baffle segment and unconnected to other locking cams of the baffle segments in the respective segmented baffle ring and locking the baffle segment relative to a stator slot at which the baffle segment is positioned without locking other locking cams of the baffle segments in the respective segmented baffle ring.

11. A dynamoelectric machine according to claim 10, wherein said baffle segment comprises a wedge formed to receive said individual locking cam such that upon twisting of said locking cam, said wedge is deformed for locking said baffle segment relative to said stator slot.

12. A dynamoelectric machine according to claim 11, wherein said individual locking cam comprises a tubular stub member having an external locking cam surface for engaging said wedge such that upon rotation of said locking cam, said external locking cam surface deforms the wedge.

13. A dynamoelectric machine according to claim 11, wherein each baffle assembly further comprises a locking plate received within a stator slot and cooperating with said wedge.

14. A dynamoelectric machine according to claim 13, wherein a locking plate includes an external lock for locking said plate relative to a slot.

15. A dynamoelectric machine according to claim 11, wherein said wedge comprises leg members forming a bore that receives said locking cam.

16. A dynamoelectric machine according to claim 10, wherein each individual locking cam comprises an end portion adapted for engaging a locking tool carried by a self-propelled vehicle that is insertable and movable within the air gap formed between said stator and rotor.

17. A dynamoelectric machine according to claim 10, wherein each baffle segment comprises a transverse member having an arcuate surface that cooperates and defines a gap with baffles on said rotor.

18. A dynamoelectric machine according to claim 17, wherein each baffle assembly comprises two baffle segments positioned adjacent to each other, and said transverse members are dimensioned to interlock transverse members of adjacent baffle assemblies forming the segmented baffle ring.

* * * * *